Oct. 3, 1950      G. E. MORRISON      2,524,632
PRESSURE COOKER CLOSURE FOR COOKING VESSELS
Filed March 10, 1947
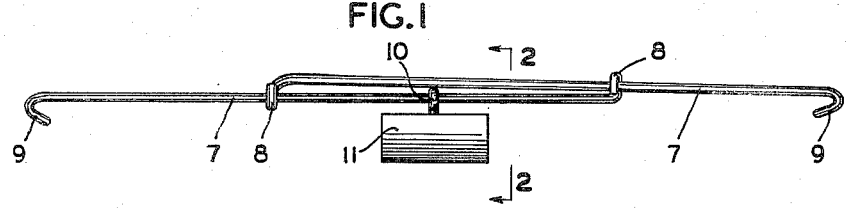
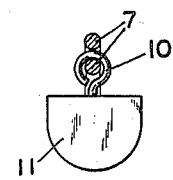
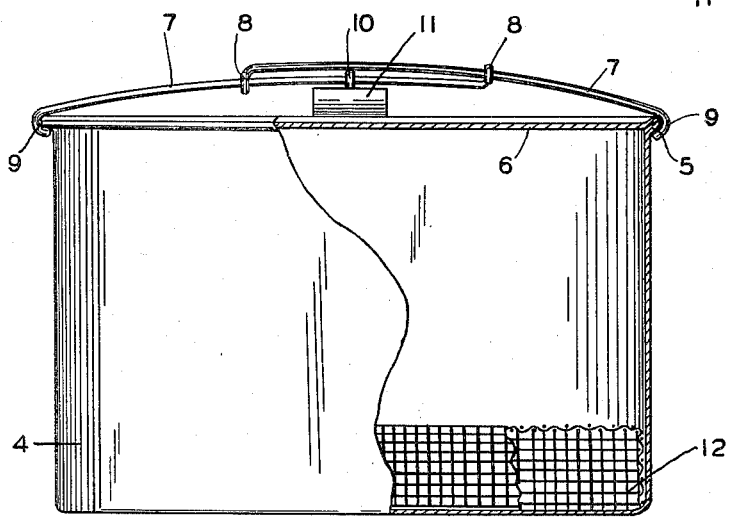
Inventor
GEORGE E. MORRISON
By Williamson & Williamson
Attorneys Patented Oct. 3, 1950

2,524,632

UNITED STATES PATENT OFFICE 2,524,632

PRESSURE COOKER CLOSURE FOR COOKING VESSELS

George E. Morrison, Minneapolis, Minn., assignor to Charles P. Halligan, St. Louis Park, Minn.

Application March 10, 1947, Serial No. 733,490

1 Claim. (Cl. 292—258)

This invention relates to cooking vessels and more particularly to attachments for ordinary kettles and sauce-pans which render the vessels capable for use as pressure cookers.

It is an object of the invention to provide an attachment for cooking vessels having removable covers, the attachment being adapted for detachable engagement with the vessel and also including means for pressing the cover or closure tightly against the mouth of the vessel to relatively tightly close the latter.

The above and other objects and advantages of the invention will more fully appear from the following description made in connection with the accompanying drawings, wherein like reference characters refer to the same parts throughout the views, and, in which:

Figure 1 is a side elevational view of the attachment;

Figure 2 is an enlarged section taken approximately on the line 2—2 of Figure 1; and Figure 3 is a view partially in side elevation and partially in vertical section of a cooking vessel with the clamping attachment in operative position thereon and also showing a steaming support in the bottom of the vessel.

In Figure 3 there is shown a conventional type of cooking vessel 4 whose upper end is open providing a mouth defined by a beaded edge 5, which, as shown, extends outwardly about the mouth. Upon the beaded edge 5 rests a top 6 which, of course, is readily removable therefrom.

The clamping device includes a pair of elongated somewhat flexible rod-like members 7 which may be made of relatively heavy wire. The rod-like members 7 have portions of their shanks lying in coextensive approximately parallel relationship. The inner end of each section 7 is turned at right angles and bent to provide a loop 8 which slidably receives the other rod-like member 7. This permits longitudinal telescoping of one rod relative to the other.

The outer ends of the rods or shanks 7 are bent over to provide hooks 9 which will open inwardly toward each other and are adapted to have their ends positioned beneath the beaded mouth portion 5 of the vessel 4 with the remainder of the clamp overlying or bridging the vessel and its cover. The longitudinal extensibility of the clamp facilitates its mounting on the vessel and also permits its use on cooking vessels of different sizes.

On one of the rod-like members 7 is an eyelet 10 which is loosely fitted on said member and the eyelet provides a movable support for a cam block 11 whose shape can readily be seen in the drawing. The cam block 11 is adapted to be swung about its supporting rod-like element 7 from a position generally laterally of said rod-like member to a position vertically therebeneath. When the clamp is mounted on a cooking vessel having its top in position as in Figure 3, the cam 11 is swung down beneath the clamp and between said clamp and the top 6 of the cooking vessel 4. The flexibility of the clamp permits it to bend somewhat and it exerts a pressure through the cam 11 and against the top 6 to hold it in a tightly closed position. The device can be readily secured in position and as easily moved, and it makes an ordinary cooking vessel adaptable for use as a pressure cooker. Should the cover or closure of the cooking vessel have a knob-like handle extending upwardly from its central portion the clamp can be mounted to one side of the knob and it will effectively hold the cover in place.

In Figure 3 the cooking vessel 4 is shown with an inverted cup-shaped wire structure 12. While it is shown made of wire it may conveniently be formed from any suitable open-work material. The object of the member 12 is to permit foods to be placed in the vessel with water whose height is less than the height of the wire element 12 so that foods can be steamed in the closed vessel whose top is held tight by the clamp above described.

If the wire member 12 is used without the clamp means for the cover steaming is not as effective since the steam will readily escape from the vessel by forcing the cover 6 upwardly as the steam pressure begins to rise.

It will, of course, be understood that various changes may be made in the form, details, arrangement and proportions of the various parts without departing from the scope of my invention.

What I claim is:

A closure fastener for a cooking vessel having a beaded mouth and a removable cover supported thereby, comprising a pair of relatively stiff yet resilient wire elements, each having a looped end slidably receiving a shank of the other wire, said wire elements having hooked outer ends, a spacer supported by said wire elements between their hooked ends and depending from an intermediate portion of said elements for interposition between a cooking vessel top and said wire elements.

GEORGE E. MORRISON.

REFERENCES CITED

The following references are of record in the file of this patent:

UNITED STATES PATENTS

| Number | Name | Date |
|---|---|---|
| 315,280 | Headley | Apr. 7, 1885 |
| 1,271,230 | Sabo | July 2, 1918 |
| 1,483,255 | Tonge | Feb. 12, 1924 |
| 1,639,870 | Valsvig | Aug. 23, 1927 |

FOREIGN PATENTS

| Number | Country | Date |
|---|---|---|
| 46,223 | Sweden | July 2, 1918 |